G. GRAYBILL.
SPRING ATTACHMENT FOR VEHICLES.
APPLICATION FILED JULY 30, 1910.
1,041,460.
Patented Oct. 15, 1912.
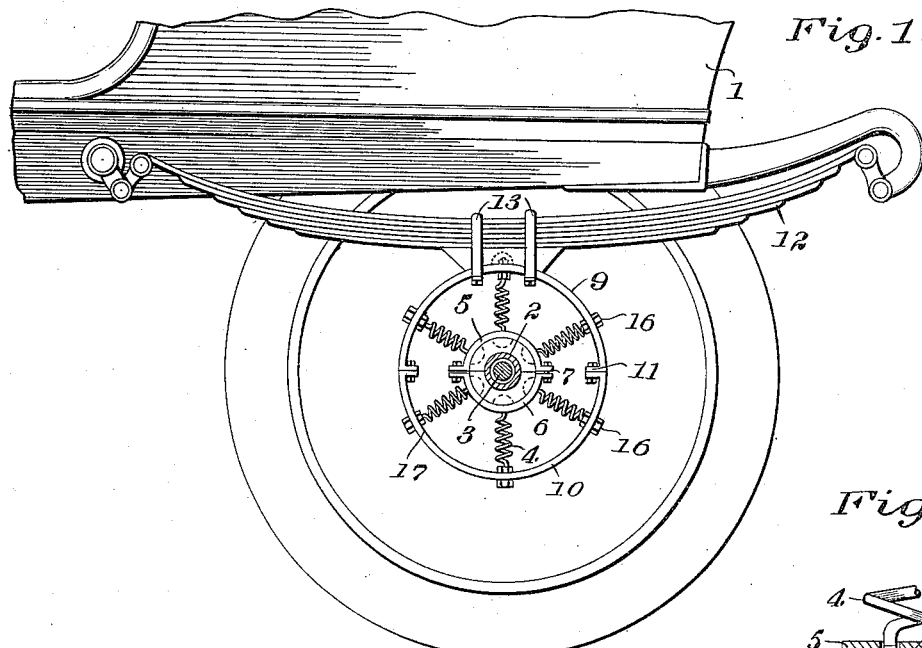
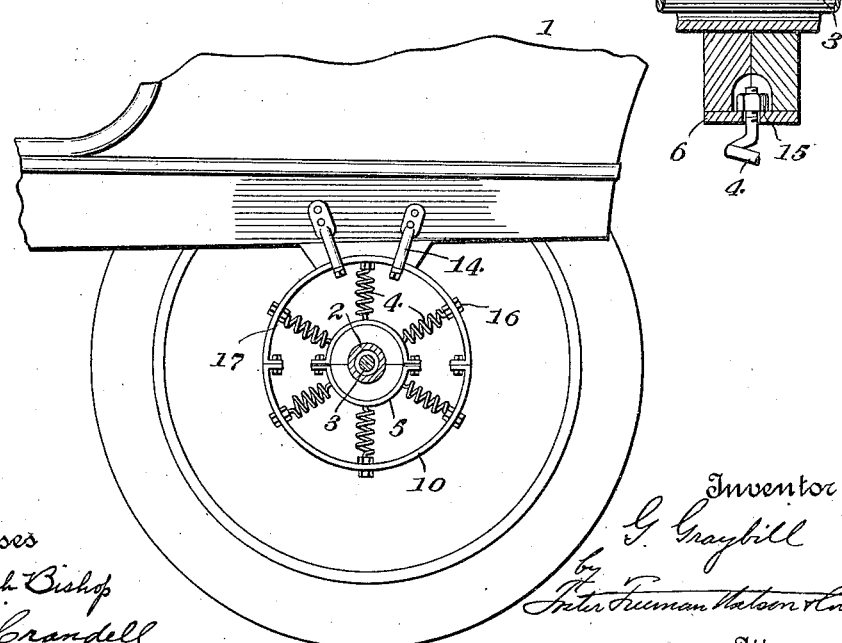

UNITED STATES PATENT OFFICE.

GEORGE GRAYBILL, OF YORK, PENNSYLVANIA.

SPRING ATTACHMENT FOR VEHICLES.

1,041,460.

Specification of Letters Patent.    Patented Oct. 15, 1912.

Application filed July 30, 1910. Serial No. 574,745.

*To all whom it may concern:*

Be it known that I, GEORGE GRAYBILL, a citizen of the United States, and resident of York, in the county of York and State of Pennsylvania, have invented certain new and useful Improvements in Spring Attachments for Vehicles, of which the following is a specification.

The present invention relates to an improved spring attachment or cushion device for vehicles, and has for its object to provide an attachment which can be readily applied to any vehicle and which will relieve the body from shocks or jars in travel over rough roads.

In the accompanying drawing: Figure 1 is a view in elevation showing a cushioning device constructed in accordance with the present invention applied to one of the body supporting springs of an automobile, the axle on which the device is mounted being shown in section; Fig. 2 is a somewhat similar view showing the cushioning device arranged directly between the axle and body; Fig. 3 is a detail sectional view, on an enlarged scale, of a portion of the attachment.

In the drawings 1 designates the vehicle body and 2 the axle the latter being shown as tubular and surrounding a suitable driving shaft or power transmitting rod 3.

The attachment embodying the present invention comprises two concentric sectional ring members and a plurality of coiled springs 4 which extend radially across the space separating the ring members and have their ends attached to such rings. The inner ring consisting of the segmental sections 5, 6 having laterally projecting ears or lugs 7 connected by bolts is secured about the axle 2, suitable bushing or filling blocks 8 being preferably provided. The outer ring member comprising the segmental sections 9, 10 having the inwardly extending lugs 11 which are securely bolted together may be connected with the body supporting spring 12 by stirrup-like hangers 13, as shown in Fig. 1, or in some instances said ring may be supported directly from the body 1 by hangers 14, as shown in Fig. 2.

The ends of the springs 4 are threaded and extend through apertures in the inner and outer ring members and are engaged by nuts 15, 16. By turning the nuts 16 the tension of the springs can be varied as desired. Each spring is also preferably provided with a lock nut 17 adjacent the inner surface of the outer ring.

It will be seen that such an attachment as is illustrated and hereinbefore described will receive and take up any shock or strain applied to the axle in any direction, a plurality of said springs being compressed and distended more or less by each movement of the axle. For example if the axle is caused to move vertically such movement will be resisted directly by the two springs arranged on the diametrical vertical line while the springs on both sides of such line will assist in absorbing the shock or blow.

It will be seen that my spring attachment is so constructed that it can be applied to any vehicle by the owner, or any person unskilled as a mechanic, by the use of a wrench or other simple tools. By making the rings sectional and the sections of the inner and outer rings to correspond, the attachment can be placed on any axle without removing the wheels. It will be understood that the filling blocks 8 are to be formed internally to suit the shape of the axle to which they are to be applied, and that these filling blocks are likewise sectional. The filling blocks should be divided on the lines which divide the inner and outer rings so that by drawing the sections of the inner ring together the block sections will be tightly clamped upon the axle. The coiled springs 4 are easily detachable so that a broken or strained spring can be quickly replaced by a new one.

In operation a shock delivered through the wheels to the axle in any direction will result in the compression of a plurality of the coiled springs on one side of the axle and the distention of the corresponding springs on the opposite side of the axle. The rings and intermediate springs will, in practice, be made of different sizes and strengths to suit vehicles of different weights, and to suit the purposes for which the vehicles are intended. It will be understood that the attachment may be made in more than two sections, although the form shown in the drawing is preferable on account of its simplicity.

Having described my invention, what I claim and desire to secure by Letters Patent is:

1. The combination with an axle, supporting wheels, and the body of a vehicle, of a sectional ring adapted to be fitted about the axle and having one of its sections connected with the vehicle body, a second similar ring adapted to be fitted about the axle within the first said ring and out of contact therewith, separable filling pieces in the space between said inner ring and the axle, and a plurality of coiled springs having their ends connected respectively to said inner and outer rings.

2. The combination with an axle, supporting wheels, and the body of a vehicle, of an attachment for the purpose described comprising a plurality of similar sections each consisting of two parallel segments and a plurality of coiled springs extending across the space between and having their ends connected to said segments, the sections being adapted to be fitted and secured together about the axle to form concentric rings connected by radially extending springs, and means for connecting one of said rings with the vehicle body.

In testimony whereof I affix my signature in presence of two witnesses.

GEORGE GRAYBILL.

Witnesses:
 T. TYRRELL HEIGES,
 ROBERT KING.

---

Copies of this patent may be obtained for five cents each, by addressing the "Commissioner of Patents, Washington, D. C."